(12) United States Patent
Kliewer et al.

(10) Patent No.: US 9,995,375 B2
(45) Date of Patent: Jun. 12, 2018

(54) SYMMETRY CONTROL FOR A CONTINUOUSLY VARIABLE TRANSMISSION DEVICE

(71) Applicant: ORBITAL TRACTION, LTD., Houston, TX (US)

(72) Inventors: Joseph D. Kliewer, Houston, TX (US); Mark M. Koeroghlian, The Woodlands, TX (US)

(73) Assignee: Orbital Traction, Ltd., Houston, TX (US)

( * ) Notice: Subject to any disclaimer, the term of this patent is extended or adjusted under 35 U.S.C. 154(b) by 107 days.

(21) Appl. No.: 14/620,011

(22) Filed: Feb. 11, 2015

(65) Prior Publication Data

US 2016/0230858 A1 Aug. 11, 2016

(51) Int. Cl.
 *F16H 15/50* (2006.01)
(52) U.S. Cl.
 CPC ................... *F16H 15/503* (2013.01)
(58) Field of Classification Search
 CPC ..................................................... F16H 15/503
 See application file for complete search history.

(56) References Cited

U.S. PATENT DOCUMENTS

| | | | | |
|---|---|---|---|---|
| 1,380,006 | A | * | 5/1921 | Nielsen ................ F16H 15/503 475/189 |
| 1,691,625 | A | * | 11/1928 | Chilton ................ F16H 15/503 123/179.22 |
| 1,718,846 | A | * | 6/1929 | Arter ................... F16H 15/503 475/189 |
| 2,349,981 | A | | 5/1944 | Mulder |
| 3,327,566 | A | | 6/1967 | Hewko |
| 3,955,661 | A | | 5/1976 | Popper |
| | | | (Continued) | |

FOREIGN PATENT DOCUMENTS

| | | |
|---|---|---|
| CN | 1428524 A | 7/2003 |
| JP | 63-297853 A | 12/1988 |

OTHER PUBLICATIONS

International Search Report and Written Opinion for International Application No. PCT/US2016/017222, dated Apr. 26, 2016, 18 pages.

(Continued)

*Primary Examiner* — Tisha D Lewis
(74) *Attorney, Agent, or Firm* — Prol Intellectual Property Law, PLLC; H. Kenneth Prol

(57) ABSTRACT

A continuously variable transmission includes a radially inner race, having a first radially inner race structure and a second radially inner race structure spaced along an axis wherein at least one of the first radially inner race structure or the second radially inner race structure is axially movable. The transmission further includes a radially outer race, having a first radially outer race structure and a second radially outer race structure spaced along an axis wherein at least one of the first radially outer race structure or the second radially outer race structure is axially movable, planetary members in rolling contact with the radially inner races and the radially outer races, and an outer race assembly that includes a hydraulic cavity housing, a hydraulic cavity sealed between the hydraulic cavity housing and the first radially outer race structure to control axial movement of the first radially outer race structure.

22 Claims, 5 Drawing Sheets

(56) References Cited

U.S. PATENT DOCUMENTS

| | | | |
|---|---|---|---|
| 4,592,247 | A | 6/1986 | Mutschler |
| 4,593,574 | A | 6/1986 | Sinn |
| 4,617,838 | A | 10/1986 | Anderson |
| 4,667,525 | A | 5/1987 | Schottler |
| 6,461,268 | B1 | 10/2002 | Milner |
| 8,740,743 | B2 | 6/2014 | Kliewer |
| 2007/0093345 | A1 | 4/2007 | Hosoi |
| 2008/0261747 | A1 | 10/2008 | Triller |
| 2014/0094339 | A1* | 4/2014 | Ogawa .................. F16H 15/28 476/38 |

OTHER PUBLICATIONS

International Search Report and Written Opinion for International Application No. PCT/US2016/017425, dated May 23, 2016, 20 pages.
International Search Report and Written Opinion for International Application No. PCT/US2016/017426, dated May 18, 2016, 19 pages.
Non-Final Office Action dated Aug. 18, 2016 in co-pending U.S. Appl. No. 14/620,031, filed Feb. 11, 2015.
Non-Final Office Action dated Nov. 25, 2016 in co-pending U.S. Appl. No. 14/619,990, filed Feb. 11, 2015.

* cited by examiner

SYMMETRY CONTROL FOR A CONTINUOUSLY VARIABLE TRANSMISSION DEVICE

This application is related to U.S. patent application Ser. No. 14/619,990 (1414-P007-US), entitled "Hydraulic Race Shifter for a Continuously Variable Transmission Device," by Joseph D. Kliewer et al., filed of even date herewith, which is hereby incorporated by reference.

This application is related to U.S. patent application Ser. No. 14/620,031 (1414-P009-US), entitled "Preload and Torsional Backlash Management for a Continuously Variable Transmission Device," by Joseph D. Kliewer et al., filed of even date herewith, which is hereby incorporated by reference.

FIELD OF THE DISCLOSURE

The present disclosure generally relates to a continuously variable transmission device, and more particularly relates to hydraulic shifting mechanisms for the same.

BACKGROUND

Continuously variable transmission devices are known in the art. For example, on one example type of such variable transmission devices, planetary members are provided in rolling contact with inner and outer races as described in U.S. Pat. Nos. 6,461,268 and 8,740,743, assigned to the present assignee and incorporated herein by reference. The inner and outer races have two radial race structures, with axial separation which is adjustable. The transmission ratio of input to output speed of the device is adjusted by varying the axial separation of the radially inner or radially outer race structures which causes a corresponding radial shift of the planetary members. The axial separation of the corresponding radially outer or radially inner race structures adjusts to compensate for the radial change in position of the planetary members. The changing position of the contact points between the planetary members and the inner and outer races causes the change in transmission ratio of the device. Typically, the inner race is coupled with an input shaft and the planetary members are coupled via a planet follower arrangement to an output shaft. However, one or more input shafts and one or more output shafts may be coupled to the inner races, the outer races, or the planet follower arrangement in a variety of configurations. Application of force via springs, electric drive motor, or other mechanically driven movement are examples of methods of varying axial separation of either the inner or outer races.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Reference numerals are used to identify the same or analogous components in the Figures where reasonable. Embodiments incorporating teachings of the present disclosure are shown and described with respect to the drawings presented herein, in which.

DETAILED DESCRIPTION OF THE DRAWINGS

Figure 1:
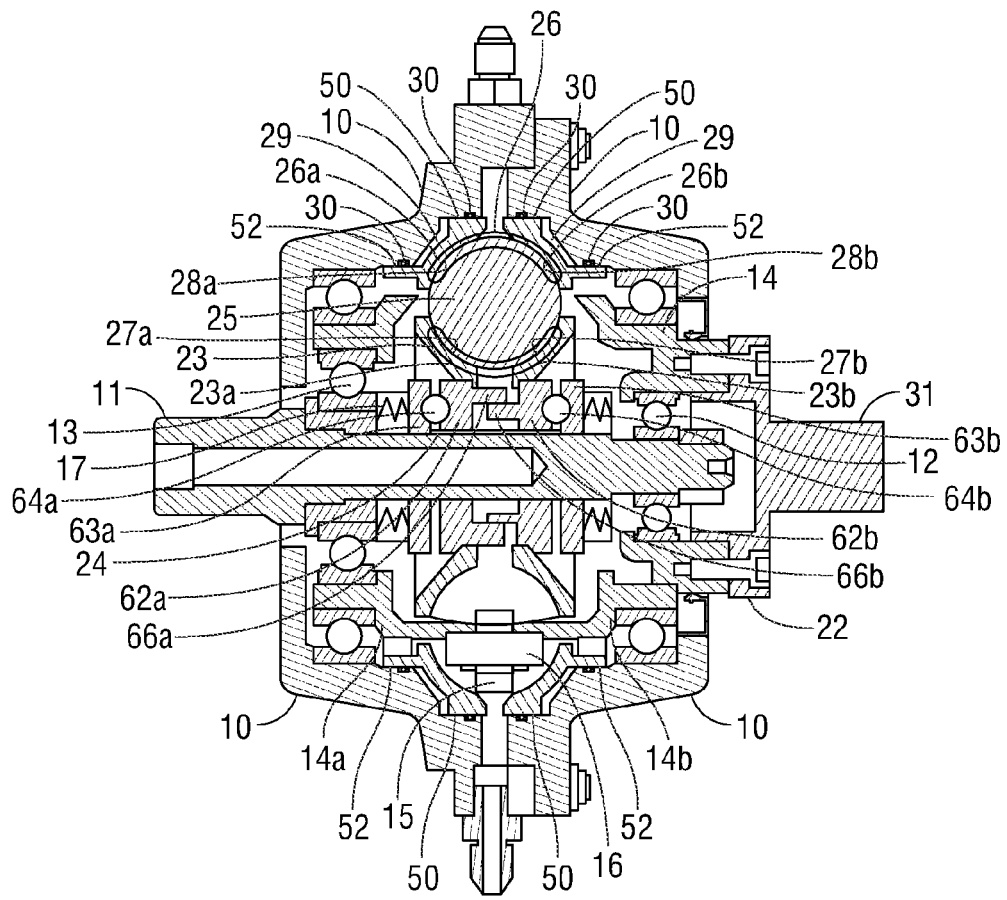
FIG. 1 is a schematic axial sectional view of a continuously variable transmission device according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of interconnections of elements within the transmission systems and components disclosed.

Referring first to FIGS. 1 to 4, the continuously variable transmission (CVT) mechanisms of the disclosure are formed as a variable radius epicyclical mechanism having rolling traction torque transfer. According to one aspect of the present disclosure, a continuously variable transmission device of the type having planetary members in rolling contact with radially inner and outer races each comprising two axially spaced parts or race structures is provided. The CVT includes a control system for selectively varying the axial separation of the two race structures of one race and thus the radial position of the planetary members in rolling contact with that race, and in which there is a system sensitive to the torque applied to a drive-transmitting member of the transmission operable to determine the compensating variation in the separation of the two race structures of the other race. For clarification, rolling contact is intended to mean contact that is not fixed. For example, planetary members may be in contact with race structures during operation of the CVT and roll along race structures. In another example, planetary members may be in rolling contact in some instances even though clamped by race structures during operation. In yet other instances, rolling contact may include a planetary member able to roll, but not rolling, such as when the CVT is at rest. This torque sensitive compensating variation determines, along with the varied axial separation of the other race, the transmission ratio of the device which in turn determines to vary the forces exchanged between the planets and the races.

In an embodiment of the CVT structure, the inner and outer races comprise include two radially inner race structures and two radially outer race structures respectively. The two race structures of the inner or outer races may be supported in such a way as to be relatively displaceable towards or away from one another. This axial movement may vary the radius of the point or line of contact between each race and the planetary members.

Axial separation of the radially inner or radially outer race structures may adjust via several possible methods. A spring may apply force to spline-coupled radially inner or radially outer race structures for a preload clamping force. In other embodiments, an inclined plane, such as a helical interengagement may be operatively coupled on the input shaft or to a CVT housing. A helical screw, ball screw, roller ramp, ramp or other structure may be used. The inclined plane structure may be used so that rotation of the input shaft in the intended direction causes the two structures of the inner or outer race to approach each other until the force exerted on the helical inter-engagement between the inner race and the input shaft matches the reaction forces between the inner race and the planetary members. The inclined plane structure need not necessarily be planar, but in some embodiments may be of variable pitch or slope depending upon the desired performance characteristics. In some aspects of the present disclosure, the inclined plane structure may be substantially planar while in other aspects it may be of variable pitch or slope. Inclined plane structure is intended to cover a variety of structures that operate as described herein during matching of approach force for opposite race structures and reactive force between the race and the planetary members. In some examples a ball ramp may couple a radially inner race or radially outer race structure with another CVT structure to cause force to be exerted to urge the two structures of an inner or outer race to approach one another until a reactive force is matching as described above. When these forces match, no further relative axial displacement of the radially inner race structures, or radially outer race structures depending on embodiment, takes place and a drive torque is transmitted at the transmission ratio determined by the radial position of the planetary members. Although this arrangement enables drive torque to be transmitted between the input and output shaft at the appropriate transmission ratio, undesirable consequences can occur. Some of these consequences may depend on the system used to axially adjust the radially inner or radially outer race structures. Accordingly, it is desired to provide an improved variable transmission device.

Shifting of the continuously variable transmission may occur via control system adjustment to the axial separation of either the radially inner race structures or the radially outer race structures creating a corresponding reaction in the opposite race via the rolling planetary members and their rolling contact with arcuate surfaces of the inner and outer races. In one or more embodiments at least one radially inner or radially outer race structure with arcuate rolling contact surface is coupled to a hydraulic cavity structure via a surface of the race structure other than the arcuate rolling contact surface. In other embodiments, inner and outer races do not necessarily need to be arcuate. The rolling contact surface of inner or outer races may be planar or of another shape in various embodiments but still function in accordance with disclosures herein. A hydraulic cavity is established between the race structure and a corresponding hydraulic cavity structure. The hydraulic cavity forms part of a control system for adjustment to axial separation via hydraulic displacement. Controlled adjustment of displacement of hydraulic fluid actuates the race structures to move axially. In other embodiments, controlled hydraulic fluid pressure permits action of torque in the CVT to axially adjust race structure in a compensating CVT shift in transmission fluid when torque causes fluid displacement in the hydraulic cavity. In several embodiments, the surface opposite to the arcuate rolling contact surface of the race structure forms one side of the hydraulic cavity.

Coupling between a surface of the radially inner or radially outer race structure and a hydraulic cavity structure establishes a race assembly including the hydraulic cavity. Coupling may be done via a sealing mechanism such as a sealing ring. In other embodiments, sealing mechanisms may be a fluid bearing seal created by close contact of surfaces between the race structure and the hydraulic cavity structure. Other sealing mechanisms are also contemplated. The hydraulic cavity is located between the race structure and the hydraulic cavity structure. In at least one embodiment, the hydraulic cavity structure may be formed from the outer housing of the CVT device. In other embodiments, the hydraulic cavity structure may be an additional structure, such as a race hydraulic cavity housing, designed to establish a hydraulic cavity with the race structure to control axial movement of the arcuate rolling contact surfaces of the race. Hydraulic fluid pressure may be adjusted via a hydraulic port into the hydraulic cavity. Hydraulic displacement in the hydraulic cavity enables axial movement of the race structure whether for an inner race or an outer race. This permits hydraulic shifting of the continuously variable transmission. Additional details and embodiments are described further below.

In several embodiments, both radially outer race structures or both radially inner race structures are part of a race assembly according to one or more embodiments disclosed herein. A hydraulic bridge passage may provide hydraulic fluid to hydraulic ports in both race assemblies of an inner race or an outer race.

According to another aspect of the present disclosure, the continuously variable transmission device described herein enables transmission of torque from an input to an output shaft and can take place in either direction of rotation. A continuously variable transmission according to embodiments herein includes planetary members in rolling contact with radially inner and outer races each comprising two axially spaced parts, with control systems for selectively varying the axial separation of the two race structures of one race and thus the radial position of the planetary members in rolling contact with that race. Additionally, according to aspects of several embodiments, there are torque sensitive couplings reactive to the torque applied to a drive-transmitting member of the transmission device. In example embodiments, a torque-sensitive mechanical coupling may be interposed between an input drive member, such as a drive shaft, and one of the races to balance the torque transmission from the drive member and the contact pressures between the two race structures and the planetary members. For example, an inclined plane structure coupled to the race of the input drive member may provide for compensating variation in the axial separation of the two race structures of the opposite race. In another example embodiment, the said torque-sensitive coupling may include that of the two axially spaced, relatively moveable race structures of the opposite race, such as that of an output member or fixed to a CVT housing. Each race structure may itself be axially movable in two directional senses from a central position and engageable by a limit stop structure to allow the transmission of rotary drive from a rotary drive input such as a drive shaft to a rotary drive output shaft of the transmission device in each of two opposite senses of rotation. In one example, an inclined plane may include a ball ramp between a race structure splined to a drive shaft and a limit stop structure.

In another aspect, the race structures of the torque-sensitive coupling are connected with the input drive member such as a drive shaft by a screw-thread engagement. The torque-sensitive coupling may be included with either side race structure or included on both race structures for a race. If operatively coupled to both race structures, the screw-thread engagement on the drive shaft may be of the opposite hand for each side of the race to urge axial displacement depending on the rotary drive direction transmitted. In one embodiment, the thread flights of the screw thread engagement may be interengaged by rolling elements such as balls to form a ball screw to reduce frictional resistance in the device.

In an embodiment, the two race structures may ultimately be restrained from axial movement such that they are limited in action exerted on it by the input member. A limit stop structure may limit axial movement and may comprise respective abutments on or carried by or associated with the said input drive member or on a CVT housing.

In several embodiments, one or both races may be fully rotational, or rotationally constrained to an input or output drive member such as a shaft. In other embodiments, either race may be rotatably fixed, including being limited in rotational movement, e.g., by a torque-sensitive coupling. In example embodiments, the two race structures of a race of the transmission device may be carried on a housing of the transmission device in such a way as to have a limited rotational displacement in each of two opposite rotational senses. In other words, they may be non-rotatable having little or no rotation except for helical interengagement with the torque sensitive coupling. The relative axial separation of the two race structures of a race may be achieved by a helical interengagement of at least one of the two race structures with a fixed member of the transmission device, the two race structures both having limited rotation with respect to the said fixed member.

In yet another aspect, two race structures forming an inner race or an outer race are rotationally constrained to one another to form another type of race assembly according to other embodiments of the present disclosure. In some embodiments, the opposite race to the hydraulic race assembly described above may have two race structures rotationally constrained with respect to one another. The race structures may also be rotationally constrained with respect to a rotating input or output shaft or a stationary inclined plane coupling structure. For example, if the outer race is part of a hydraulic outer race assembly, it is possible that the rolling planetary members may float axially with respect to the outer race assembly. In an embodiment, the radially inner race structures, each with an arcuate rolling contact surface, are rotationally constrained with respect to one another and must rotate in symmetry. Since the radially inner race structures may also be rotationally constrained with respect to an input or output shaft via helical inter-engagement or other inclined plane engagement, the radially inner race structures may maintain symmetry and limit or eliminate axial "float" of the rolling planetary members. The reverse arrangement is also contemplated wherein the radially inner race structures are part of a hydraulic inner race assembly in other embodiments. In this case, the radially outer race structures may be rotationally constrained to one another and to an inclined plane structure that is fixed or coupled to a rotating input or output shaft.

FIG. 1 shows a CVT in an embodiment of the present disclosure. In the example embodiment, the CVT is a variable radius epicyclical transmission device. The CVT shown depicts a housing 10 within which is mounted a sun shaft 11, and rolling element bearings 12, 13 within a planet carrier 14 carrying planet follower members 15. In the present embodiment, sun shaft 11 is also referred to as an input shaft 11. It is understood that sun shaft 11 may also be an output in certain configuration embodiments as well. The planet follower members 15 are rotatably borne on the planet carrier 14 by planet follower shafts 16. Any number of planet follower members 15 are contemplated and may depend on the number of spherical planetary members 25. The spherical planetary members 25 are substantially spherical as described below and captive between the radially inner races 23 and the radially outer races 26. The planet follower members 15 are circumferentially intercalated between adjacent pairs of spherical planetary members 25 for transmitting drive to or from the said spherical planetary members 25. In an embodiment, planet follower members 15 are carried on planet carrier 14 by planet follower shafts 16 which transmit drive to or from spherical planetary members 25 in operation of the CVT device.

The planet carrier 14 is effectively comprised by two radial plates 14a, 14b joined together by shouldered studs 16 forming the planet follower shafts. An axial cylindrical extension 22 of the radial plate 14b of the planet carrier 14 comprises an output and may be further coupled to the output shaft 31 of the transmission mechanism. It is understood that the input and output relationship described above may also be reversed in other embodiments.

Input shaft 11 may carry a radially inner race 23 comprising a sun member including two structures 23a, 23b which are engaged to the shaft 11. Radially inner race 23 may be coupled to the input shaft via a coupling comprising a spline or other coupling including a torque sensitive inclined plane structure such as a helical interengagement in the form of a screw threaded engagement (not shown). In one embodiment, radially inner race structures 23a and 23b are coupled to the input shaft via a spline. Radially inner race structures 23a and 23b are axially movable along the axis of rotation of the input shaft 11. Inward axial movement may be urged by a mechanical, electromechanical, or hydraulic mechanism as described in embodiments below. In the presently shown embodiment, springs 17 are used to apply a preload force to urge axial movement of radially inner race structures 23a and 23b for clamping of the inner race 23 to the spherical planetary members 25. Other couplings to the input shaft are also contemplated. In some embodiments, the two radially inner race structures 23a and 23b have oppositely handed threads so that, for reasons which are described in more detail in above and in U.S. Pat. No. 6,641,268 incorporated herein fully by reference, a relative rotation of the input shaft 11 and the radially inner race structures 23a, 23b in one directional sense will cause the two race structures to be displaced towards one another whereas axial separation of the two race structures 23a, 23b of the inner raceway occurs where there is relative rotation between them and the input shaft 11 in the opposite directional sense.

Spherical planetary members 25 are engaged between the radially inner race 23 and a radially outer race 26. Radially outer race 26 also comprises two axially separated annular race structures 26a, 26b. Rolling contact surfaces of the race structures 23a, 23b and 26a, 26b, respectively identified as 27a, 27b and 28a, 28b each include, in cross-section, an arcuate surface the radius of which is slightly greater than the radius of the spherical planetary members 25. Hereinafter, spherical planetary members include planetary members that are substantially spherical bodies or have surfaces of revolution that are spherical or substantially spherical. Substantially spherical as is understood may include right circular, oblate or prolate spheroids or other structures capable of symmetrical revolution. Alternatively, the planetary members may have respective first and second surface portions comprising surfaces of revolution about the same axis (for each member) the surface portions being inclined with respect to one another in opposite directions about the axes of revolution and only the surface portions of the planetary member in rolling contact with inner or outer races being substantially spherical. The spherical planetary members may have a convex or concave surface of revolution defined by a curved generatrix which may be a regular or irregular curve or a part-circular curve. In the case of a part-circular generatrix this may be a semi-circle, in which case the surface of revolution of the planetary member is substantially spherical.

The radially outer race structures 26a, 26b are coupled to housing 10 via hydraulic cavity 29 which may act as an axial adjustment mechanism via hydraulic displacement in an embodiment. Dynamic sealing mechanisms such as an o-ring or fluid bearing seal, shown at 30, may form a hydraulic seal for cavity 29 between housing 10 of the CVT and radially outer race structures 26a, 26b. Other axial adjustment mechanisms are also contemplated in different embodiments including a mechanical system such as a lever or arm, screw mechanism, and electromechanical mechanism or other mechanism to axially adjust the distance between radially outer race structures 26a, 26b. In other embodiments, hydraulic cavity 29 may be formed between radially outer race structures 26a, 26b and an outer race hydraulic cavity housing (not shown) located between the radially outer race structures 26a, 26b and housing 10. In one such embodiment therefore, the outer race assembly may be rotatable with respect to an input or output shaft, including radially outer race structures 26a, 26b.

In operation of shaft 11, an input shaft in one embodiment, the transmission rotation of the shaft 11 is transmitted to the inner race 23, rotation of which causes rotation of the spherical planetary members 25 by rolling contact. The spherical planetary members 25 are in rolling contact with outer race 26. In one embodiment, outer race 26 may rotate and connect to another output shaft. In other embodiments, outer race 26 may be non-rotating. Rotation of the spherical planetary members 25 is transmitted via the planet followers 15 to the planet carrier 14 and thus to the output shaft 31. Spherical planetary members 25 are also in rolling contact with outer race 26. By hydraulic displacement in hydraulic chamber 29 via either increased or decreased hydraulic fluid, the two radially outer race structures 26a, 26b of the outer race can be urged towards one another or allowed to move axially away from one another respectively. Axial approach of the two radially outer race structures 26a, 26b applies pressure to the spherical planetary members 25 causing the spherical planetary members 25 to move radially inwardly and urge the two radially inner race structures 23a, 23b apart. In an embodiment, a helical interengagement between the radially inner race structures 23a, 23b and the shaft 11 acts in effect as a torque-sensitive mechanism in that the helical interengagement is such that rotation of the shaft 11 in the intended direction of drive causes the race structures 23a, 23b to approach one another axially when resisted by drag so that any play in the rolling contact between the races and the spherical planetary members 25 is taken up and compensated by the tendency of the race structures 23a, 23b to approach one another until the forces exerted on the helical interengagement between the race structures 23a, 23b and the drive shaft 11 matches the reaction forces between the race structures 23a, 23b and the spherical planetary members 25. At this point, no further relative axial displacement of the race structures 23a, 23b takes place and drive transmission takes place at a transmission ratio determined by the radial position of the spherical planetary members 25 when this occurs.

Figure 2:
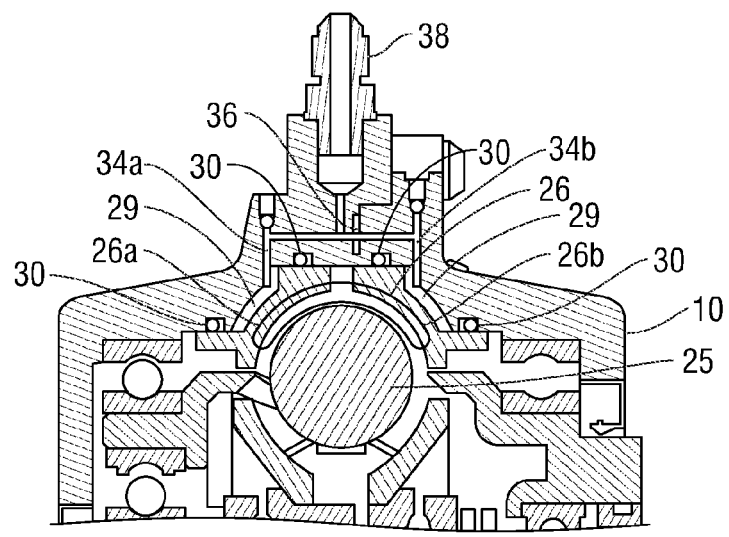
FIG. 2 is another schematic axial view of a continuously variable transmission device according to an embodiment of the present disclosure.

FIG. 2 shows a closer view of the CVT in another embodiment. As can be seen, radially outer race structures 26a and 26b form outer race 26 which may be in rolling contact with spherical planetary member 25. Hydraulic cavity 29 is formed between radially outer race structures 26a and 26b and CVT housing 10. In other embodiments, hydraulic cavity 29 may be formed between radially outer race structures 26a and 26b and a hydraulic cavity structure such as an outer race hydraulic cavity housing (not shown) separate from the CVT housing 10. Hydraulic ports 34a and 34b permit adjustment to hydraulic displacement or hydraulic pressure in the hydraulic cavity 29. Input or removal of hydraulic fluid may be made via connector port 38. Hydraulic bridge 36 may link hydraulic ports 34a and 34b to permit uniform application of hydraulic displacement or hydraulic pressure in hydraulic cavities 29 associated with radially outer race structures 26a and 26b in one embodiment. In this way, some uniformity and symmetry may be maintained between radially outer race structures 26a and 26b, especially when positive hydraulic displacement is applied. Nonetheless, it is possible for radially outer race structures 26a and 26b to float or slide to one or the other side causing spherical planetary members 25 and inner race 23 to also potentially slide. This is addressed more fully below.

Input ports 34a, 34b and hydraulic bridge 36 allow for hydraulic fluid connection to the CVT to allow control over hydraulic displacement for radially outer race structures 26a and 26b via the hydraulic cavities 29. Sealing mechanisms 30 are used to establish one or more hydraulic cavities between radially outer race structures 26a and 26b and housing 10. In other embodiments, an outer race hydraulic cavity housing or other hydraulic cavity structure may also be fitted with radially outer race structures and be of varied shapes to accommodate a hydraulic cavity. The sealing mechanisms 30 may be a gasket, a sealing layer, or a fluid bearing seal formed of hydraulic fluid at a junction point or points that are in close proximity between radially outer race structures 26a and 26b and housing 10. Such junction points may be, for example, edges or shoulders of a distal surface of radially outer race structures 26a and 26b and housing 10 or other hydraulic cavity structure designed to fit together in close proximity. Corresponding edges or shoulders of an inner surface of housing 10 or another hydraulic cavity structure are in close proximity to the edges of shoulders of the distal surface of the radially outer race structures. The sealing mechanisms 30 still may permit radially outer race structures 26a and 26b to move axially. In some embodiments, sealing mechanisms 30 may permit radially outer race structures 26a and 26b also to rotate about the axis of input shaft 11.

In the configurations illustrated in FIGS. 1 and 2 it will be seen that when the radius of rolling contact between the spherical planetary members 25 and the inner race 23 is relatively small and the radius of contact between the spherical planetary members 25 and the outer race 26 is also relatively small, the transmission ratio between the input shaft 11 and output shaft 31 is at a low level. By relaxing hydraulic displacement with a negative displacement, in hydraulic cavity 29, outer race structures 26a, 26b are allowed to move apart so that the spherical planetary members 25 can move radially outwardly as compensated by axial approach of the radially inner race structures 23a, 23b. This increases the transmission ratio between the input shaft 11 and output shaft 31. It is understood that input shaft 11 and output shaft 31 may be reversed with respect to input or output to the CVT in which case relaxing hydraulic displacement will reduce transmission ratio. In either case, hydraulic displacement shifts the CVT.

By actuating hydraulic displacement in hydraulic cavity 29, outer race structures 26a, 26b are urged to move together so that the spherical planetary members 25 can move radially inwardly again as assisted by axial approach of the radially inner race structures 23a, 23b. This again reduces the transmission ratio. It is understood that in the case where input and output are reversed, the actuated hydraulic displacement would increase the transmission ratio between the reversed input and output. Again, positive hydraulic displacement shifts the CVT.

The difference between the curvature of the curved rolling contact surfaces 28a, 28b of radially outer race structures 26a, 26b and curved rolling contact surfaces 27a, 27b of radially inner race structures 23a, 23b of the races 26, 23 and the shape of the spherical planetary members 25 will determine the precise shape of the contact path, which changes in response to transmission ratio changes. Although the contact may be a point contact, in practice, because the interior of such a variable transmission would contain a lubricant in the form of a special traction fluid which both lubricates the moving parts and enhances the rolling traction between them, the points of contact will comprise contact patches which may be larger the closer the radii of the contacting surfaces are to one another.

The continuously variable transmission mechanism described above is extremely compact and highly efficient. A pressurized hydraulic circuit connected to input port 38 may be used for control purposes in order to achieve the required function.

For example, in another embodiment, hydraulic pressure may be controlled or set to a level in the hydraulic cavity 29 via an accumulator (not shown) attached to the input port 38. Some pressure control on the accumulator, such as a pump, is used increase or decrease pressure to control step pressure levels. When input torque increases due to load or other factors, the increasing torque may push the outer race structures 26a, 26b apart and the inner race structures 23a, 23b will push axially inward on the planetary members 25. The outer race structure separation causes decreased hydraulic displacement in the hydraulic cavity 29 that is held at a step pressure level. A compensating shift in the CVT thus increases the transmission ratio between the input shaft 11 and output shaft 31. It is again understood that input shaft 11 and output shaft 31 may be reversed as to input or output in which case torque change causing outward movement of planetary members 25 will reduce transmission ratio. In either case again, torque and controlled hydraulic pressure cause hydraulic displacement to shift the CVT.

Figure 3A:
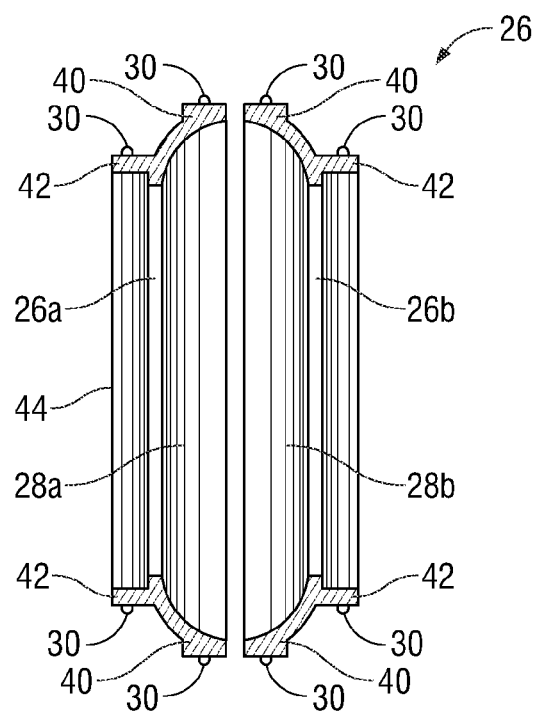
FIG. 3A is a schematic axial section view of a radially outer race structure according to an embodiment of the present disclosure.
Figure 3B:
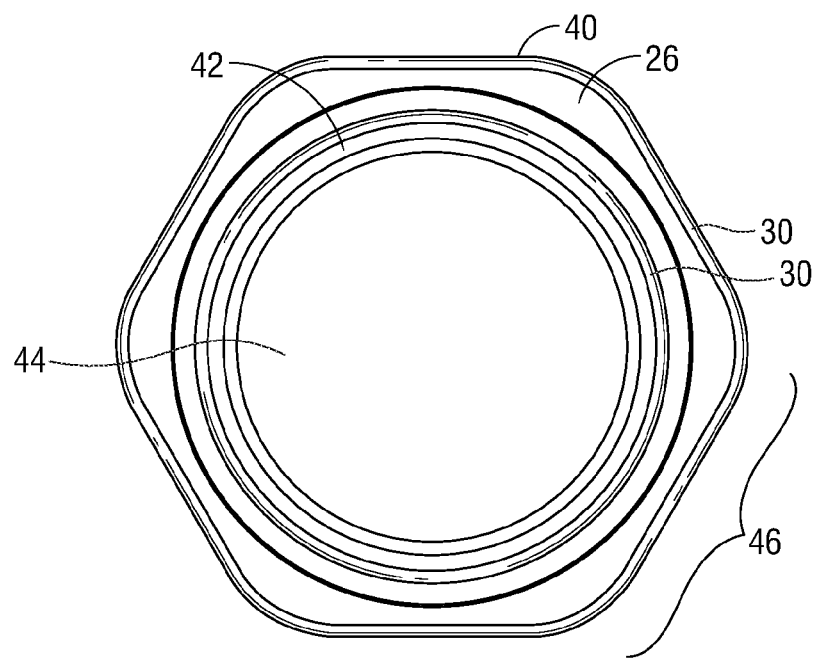
FIG. 3B is a schematic view of a radially outer race structure according to an embodiment of the present disclosure.

FIG. 3A shows a cross section of radially outer race structures 26a and 26b of one example embodiment of an outer race 26. FIG. 3B shows a side view of a race structure of outer race 26 in accordance to another embodiment of the present disclosure. Radially outer race structures 26a and 26b are shown and include arcuate rolling contact surfaces 28a and 28b. Sealing mechanisms 30 are shown in the present embodiment mounted on a surface opposite to arcuate rolling contact surfaces 28a and 28b and distal to a plane of rotation for the spherical planetary members 25. In this example embodiment, o-ring sealing mechanisms are shown, but several alternate sealing mechanisms are contemplated including example embodiments discussed further above. In other embodiments, sealing mechanisms may be mounted on a housing or other hydraulic cavity structure that is designed to fit with radially outer race structures 26a and 26b to create a hydraulic cavity as described above. In yet another embodiment, sealing mechanisms 30 may be mounted on both radially outer race structures 26a and 26b and the housing or other hydraulic cavity structure. And in yet another embodiment, sealing mechanisms may not be mounted but instead be formed between portions of radially outer race structures 26a and 26b in close proximity to portions of a fitted hydraulic cavity structure or housing as with, for example, a fluid bearing seal.

Those close proximity portions may be designed to fit with corresponding structure of the other part or parts forming a hydraulic cavity. Example of portions of the radially outer race structures 26a and 26b may include an edge or shoulder 40 on the distal surface of the radially outer race structures 26a and 26b. The outer surface of radially outer race structures 26a and 26b may be considered in some embodiments to be a surface or surfaces opposite to the arcuate rolling contact surfaces 28a and 28b. Edge 40 is designed to nest into a corresponding surface of a housing or other hydraulic cavity structure to establish a hydraulic seal on one side of a hydraulic cavity. A second edge or shoulder 42 may be formed to form a second hydraulic seal on another side of the hydraulic cavity. In one embodiment, the second edge 42 may be formed of an edge protruding from an outer surface of radially outer race structures 26a and 26b. In an embodiment, second edge 42 may be formed as an edge around opening 44 through which an input shaft, inner race, planet carrier, planet followers, and other CVT components may fit.

FIG. 3B shows a side view of a radially outer race structure 26a or 26b. Sealing mechanisms 30 are mounted on a first edge or shoulder 40 on the distal surface of the radially outer race structure 26a or 26b and a second edge or shoulder 42 respectively. Between the sealing mechanisms 30 on the first 40 and second edge 42 is part of the radially outer race structure 26a or 26b forms one side of a hydraulic cavity. Opening 44 allows for passage of CVT components such as an input shaft, inner race, planet carrier, and planet followers among other components. Opening 44, and second edge 42, are round in the present embodiment permitting rotation of the CVT components that pass through opening 44. First edge or shoulder 40 is of a polygonal shape 46 in the present embodiment. The profile polygonal shape 46 of first edge 40 fits correspondingly with a polygonal shape of a housing of the CVT or an outer race hydraulic cavity housing or other hydraulic cavity structure to form a side of the hydraulic cavity. The profile polygonal shape 46 of first edge 40 in some embodiments prevents rotation of outer race 26 about the axis of rotation of the input shaft. In other embodiments, the profile polygonal shape 46 of first edge 40 prevents rotation of radially outer race structure 26a or 26b separate from an outer race hydraulic cavity housing or other hydraulic cavity structure. It is understood that any polygon may be used and that partial polygons or shapes with a straight edge or an angle may be used instead to achieve a similar purpose to a polygonal shape. In other embodiments, a spline structure or post structure may be used to hold the radially outer race structure 26a or 26b non-rotationally relative to a hydraulic cavity structure or housing.

Turning back to FIG. 1, an embodiment is shown with a sealing mechanism 30 mounted in an edge or shoulder 50 of housing 10 corresponding to first edge 40 of radially outer race structure 26a. Another sealing mechanism 30 is mounted in an edge or shoulder 52 of housing 10 corresponding to second edge 42 as described above for radially outer race structure 26b. Each hydraulic cavity 29 is between radially outer race structure 26a or 26b and housing 10 in the embodiment of FIG. 1. Profile polygonal shape 46 of first edge 40 is designed to fit nestingly into housing 10 so outer race 26 is non-rotatable in this embodiment. In other embodiments, outer race 26 may not have a profile polygonal shape, but instead may have a rounded shape to allow rotation of outer race 26 and allow coupling to an output or input shaft.

FIG. 1 also shows detail of inner race 23. Radially inner race structures 23a and 23b are operatively coupled to a torque sensitive inclined plane structure. In an embodiment, one half of the inclined plane structure may be formed in radially inner race structures 23a and 23b. In the shown embodiment, radially inner race structures 23a and 23b are operatively coupled to race load ramp inner parts, 62a and 62b respectively, of a race load ramp. In this embodiment a ball ramp is shown, but other inclined plane structures are also contemplated. The ball ramp of the present embodiment includes race load ramp inner parts 62a and 62b, race load ramp outer parts 63a and 63b, and an intermediate spherical structure 64a and 64b such as a ball, oblate or roller pin. In other embodiments, the inner half of the inclined plane structure may be formed in radially inner race structures 23a and 23b, and not be a separate structure.

The radially inner race structures 23a and 23b may be operatively coupled to shaft 11 via splines 24 in the current embodiment. However, additional coupling mechanisms are contemplated as disclosed above. Additionally, in the present embodiment, radially inner race structures 23a and 23b are operatively coupled to shaft 11 via intermediate race load ramp inner parts 62a and 62b respectively. Race load ramp inner parts 62a and 62b are in turn operatively coupled to shaft 11 via a spline or other coupling mechanism. The radially inner race structures 23a and 23b may be operatively coupled to shaft 11 via splines 24 in the current embodiment with different intermediate structures or no intermediate structures.

The spherical structure 64a and 64b of inclined planes are also operatively coupled to race load ramp inner parts 62a and 62b and race load ramp outer parts 63a and 63b to establish symmetrical urging of radially inner race structures 23a and 23b inward during changes in torque. Similarly, inclined planes 64a and 64b may relax inward urging of radially inner race structure 23a and 23b during a reverse in torque. An example of an inclined plane structure may include a ball ramp splined to shaft 11 and operatively coupled to radially inner race structures 23a and 23b via race load ramp inner parts 62a and 62b. Spring 17 also establishes an inwardly urging preload force on radially inner race structures 23a and 23b to counter adjustments in transmission ratios at the outer race 26. This preload force of spring 17 may be sufficient to cause clamping for radially inner races 23a and 23b in the present embodiment for compensation during shifting of the CVT. It is understood that radially inner race structures 23a and 23b and race load ramp inner parts 62a and 62b may instead be a single radially inner race structure or may be multiple components coupled between shaft 11 and the rolling contact surfaces with spherical planetary members 25.

In an embodiment of FIG. 1, race load ramp inner parts 62a and 62b have extension surfaces 66a and 66b respectively extending from respective facing surfaces between each race load ramp 62a and 62b. Similarly, extension surfaces 66a and 66b may extend from the radially inner race structures 23a and 23b in other embodiments; for example, where the race load ramp inner part and radially inner race structure are a single piece structure. In an embodiment, the extension surface 66b fits into extension surface 66a. The reverse relationship is contemplated in other embodiments as well as various combinations of geometrical shapes designed to fit together. Radially inner race structures 23a and 23b and/or race load ramp inner parts 62a and 62b remain axially movable with respect to one another. However, radially inner race structures 23a and 23b remain axially aligned. Moreover, extension surfaces 66a and 66b may be polygonal or have a spline feature to cause radially inner race structures 23a and 23b to be rotationally constrained to one another.

The radially inner race structures 23a and 23b are rotationally constrained with respect to one another and are under urging of a ball ramp, springs or other mechanisms. With this or similar embodiments, a spherical planetary member 25 cannot advance into the radially inner race structures 23a and 23b more on either side during a transmission ratio shift involving narrowing the orbit or radius of rotation of the spherical planetary member. This may occur with imperfect clamping by the radially inner race structures 23a and 23b in compensating on movement of spherical planetary member 25. The race load ramp inner parts 62a and 62b and radially inner race structures 23a and 23b are approximately locked in timing and rotation such that one cannot advance on an inclined plane structure such as a ball ramp or helical interengagement differently from the other. This also has an effect of reducing or eliminating float of the spherical planetary member 25 due to any float of the hydraulically actuated radially outer race structures 26a and 26b. Control of float may also be controlled by control of hydraulic displacement to either or both sides of outer race 26. However, rotationally constrained radially inner race structures 23a and 23b in addition to an inclined plane coupling of a ball ramp or other structure may also reduce or eliminate float of the inner race 23, outer race 26 and spherical planetary members 25. Reducing float may avoid potential damage to follower 15 or radial plates 14a or 14b due to axial misalignment.

In another embodiment discussed above but not shown, the race load ramp inner parts 62a and 62b are coupled to shaft 11 via a helical interengagement in the form of a screw threaded engagement. Torque on shaft 11 may cause urging of radially inner race structures 23a and 23b inwardly if screw threads are opposite for each of race load ramp inner parts 62a and 62b. Which direction of torque in shaft 11 urges the radially inner race structures 23a and 23b inwardly depends on the arrangement of the helical threading. The reverse torque direction will relax the helical interengagement and permit the radially inner race structures to separate. Either direction of torque on shaft 11 is contemplated to urge the radially inner race structures inward in such embodiments.

Figure 4A:
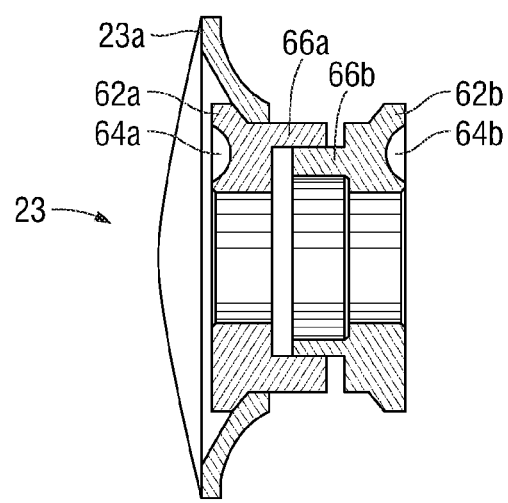
FIG. 4A is a schematic axial section view of a radially inner race structure according to an embodiment of the present disclosure.
Figure 4B:
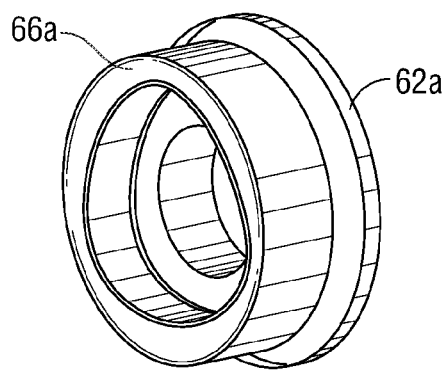
FIG. 4B is a schematic view of a race load ramp inner part structure according to an embodiment of the present disclosure.
Figure 4C:
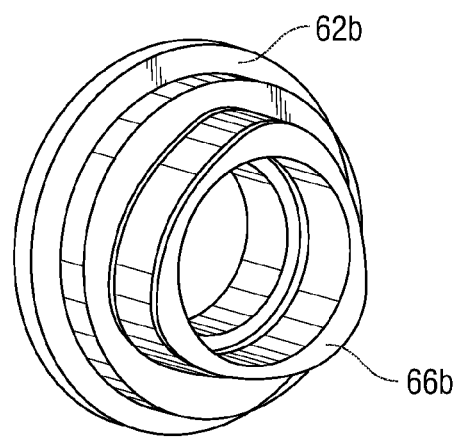
FIG. 4C is a schematic view of another race load ramp inner part according to an embodiment of the present disclosure.

FIGS. 4A, 4B, and 4C show additional detail of race load ramp inner parts 62a and 62b as disclosed in one embodiment of FIG. 1. FIG. 4A depicts a partial cross sectioned view of an inner race 23 according to an embodiment of the present disclosure. Radially inner race structure 23a is coupled to race load ramp inner part 62a in this embodiment. For simplicity, radially inner race structure 23b is not shown coupled to race load ramp inner part 62b. Each race load ramp inner part 62a and 62b is part of a ball ramp, such as that including spherical structures 64a and 64b respectively. Race load ramp inner part 62a has an extension surface 66a that fits correspondingly into a cavity formed by extension surface 66b of race load ramp inner part 62b. Extension surfaces 66a and 66b extend from surfaces facing one another between race load ramp inner parts 62a and 62b during operation. Extension surfaces 66a and 66b still allow race load ramp inner parts 62a and 62b to move axially in alignment. Any combination of extension surfaces or edges of surfaces 66a and 66b in geometries that fit together is contemplated.

FIG. 4B depicts an angle view of race load ramp inner part 62a according to one embodiment. As can be seen from FIG. 4B, extension surface 66a is such that a polygonal cavity is established inside an edge of extension surface 66a. FIG. 4C depicts an angle view of race load ramp inner part 62b according to one embodiment. As can be seen from FIG. 4C, extension surface 66b is a polygonal extension surface that fits correspondingly into polygonal cavity of extension surface 66a. In other embodiments, extension surfaces extension surfaces 66a and 66b may be of other shapes so as to fit correspondingly and maintain rotational symmetry between race load ramp inner parts 62a and 62b and, thus, radially inner race structures such as those described in embodiments above. Similarly, other embodiments may use a spline, dowel pegs, or other structures to rotationally constrain race load ramp inner parts 62a and 62b while allowing axial movement as is understood. As explained in other embodiments, similar structure to rotationally constrain may be designed into radially inner race structures 23a and 23b directly, or additional intermediate structures may be used to rotationally constrain radially inner race structures 23a and 23b with respect to one another.

Figure 5:
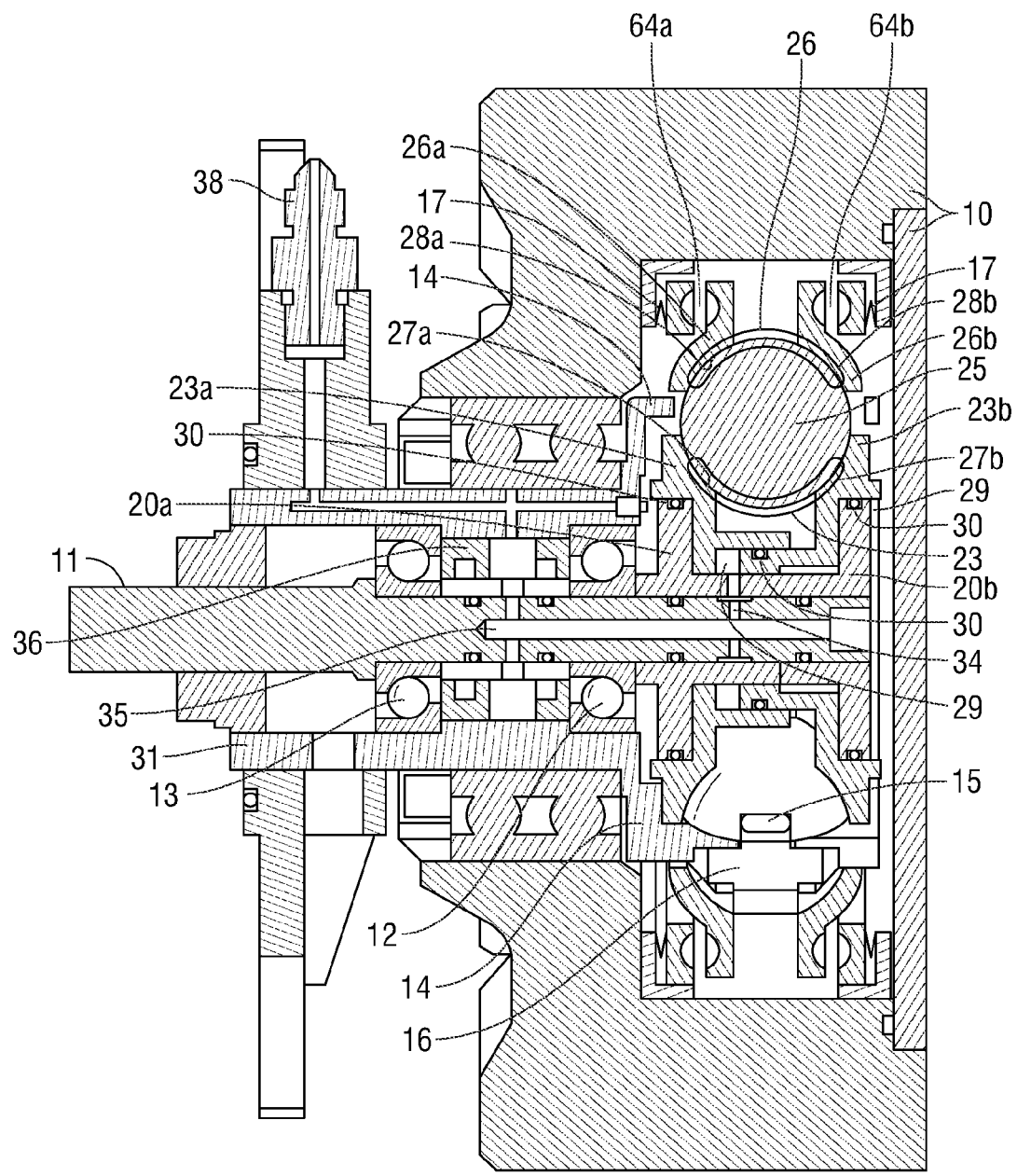
FIG. 5 is an axial sectional schematic view of a continuously variable transmission device according to another embodiment of the present disclosure.

FIG. 5 shows a continuously variable transmission (CVT) in another embodiment of the present disclosure. In the example embodiment, the CVT is a variable radius epicyclical transmission device. In this embodiment the same reference numerals are used to identify the same or similar components as in other embodiments.

In the example embodiment of FIG. 5, the CVT shown depicts a housing 10 within which is mounted an input shaft 11 bearing rolling element bearings 12, 13. Planet carrier 14 carries three planet follower members 15. The planet follower members 15 are rotatably borne on the planet carrier 14 by planet follower shafts 16. Any number of planet follower members 15 are contemplated and may depend on the number of spherical planetary members 25. The spherical planetary members 25 are substantially spherical as described above with respect to FIG. 1. Spherical planetary members are captive between radially inner races 23 and the radially outer races 26, with planet follower members 15 circumferentially intercalated between adjacent pairs of spherical planetary members 25 for transmitting drive to or from the said spherical planetary members 25. In an embodiment, planet follower members 15 are carried on planet carrier 14 by planet follower shafts 16 which transmit drive to or from spherical planetary members 25 in operation of the CVT device.

The planet carrier 14 effectively includes a radial plate together with shouldering studs forming the planet follower shafts 16. In the present embodiment, outer race structures 26a and 26b are rotationally constrained to housing 10 causing housing 10 to rotate as an output. It is understood that the input and output relationship described above may also be reversed in other embodiments.

Input shaft 11 may carry a radially inner race 23 comprising a sun member further comprising two structures 23a, 23b which are engaged to the shaft 1. Radially inner race 23 may be coupled to the input shaft via a coupling comprising a spline or other coupling including a helical interengagement in the form of a screw threaded engagement (not shown). In one embodiment, radially inner race structures 23a and 23b are coupled to input shaft via a spline. Radially inner race structures 23a and 23b are axially movable along the axis of rotation of the input shaft 11. Inward axial movement may be urged by a mechanical, electromechanical, or hydraulic mechanism as described in embodiments below.

The radially inner race structures 23a, 23b are coupled to hydraulic cavity structures 20a and 20b via hydraulic cavity 29. Hydraulic cavity structures, such as inner race hydraulic cavity housings 20a and 20b serve as a side of hydraulic cavity 29 and are coupled to input shaft 11. As shown in one example embodiment, inner race hydraulic cavity housing 20b is coupled to input shaft 11 via a threaded screw coupling which holds inner race hydraulic cavity housing 20a in place relative to a stop limit structure coupled to shaft 11. As before, shaft 11 may serve as an input or output shaft depending on configuration.

Hydraulic cavity 29 may act as an axial adjustment mechanism for radially inner race structures 23a and 23b via hydraulic displacement. Sealing mechanisms 30 such as an o-ring or fluid bearing seal form a hydraulic seal for cavity 29 between inner race hydraulic cavity housings 20a, 20b and radially inner race structures 23a, 23b. Other axial adjustment mechanisms are also contemplated in different embodiments including a mechanical system such as a lever or arm, screw mechanism, and electromechanical mechanism or other mechanism to axially adjust the distance between radially inner race structures 23a, 23b. In other embodiments, hydraulic cavity 29 may be formed between radially inner race structures 23a, 23b and an inner race hydraulic cavity housing not coupled to an input or an output shaft (not shown). In one such embodiment therefore, the inner race assembly may be rotatable with respect to an input or output shaft, including radially inner race structures 23a, 23b. In yet other embodiments, the hydraulic cavity 29 may be formed between radially inner race structures 23a, 23b and extensions of housing 10. In such an embodiment, the radially inner race structure 23a, 23b may be rotatable relative to housing 10 of the CVT which itself may be fixed or rotatable.

Spherical planetary members 25 are engaged between the radially inner race 23 and a radially outer race 26 also comprising two axially separated annular race structures 26a, 26b. Rolling contact surfaces of the race structures 23a, 23b and 26a, 26b, respectively identified as 27a, 27b and 28a, 28b, each comprise an arcuate surface in cross-section the radius of which is slightly greater than the radius of the spherical planetary members 25.

In the presently shown embodiment, springs 17 are used to apply a preload force to urge axial movement of radially outer race structures 26a and 26b. Radially outer race structures 26a and 26b may be coupled to housing 10 via an inclined plane structure, such as ball ramp 64a and 64b. Other couplings to the housing 10 are also contemplated including helical interengagement by one or both radially outer race structures 26a and 26b. Thread direction may be used to cause axial movement of one or both structures depending on rotation applied to radially outer race structures 26a and 26b. Radially outer race structures 26a and 26b may be non-rotatable in that only some rotation may occur via the helical interengagement or an inclined plane as described. In some embodiments, the two radially outer race structures 26a and 26b may be coupled via oppositely handed threads so that, for reasons which are described in more detail above and in U.S. Pat. No. 6,641,268 incorporated herein fully by reference, a relative rotation of the radially outer race structures 26a and 26b relative to housing 10 in one directional sense will cause the two race structures to be displaced towards one another to clamp radially outer race structures 26a and 26b to spherical planetary member 25. Similarly, axial separation of the two radially outer race structures 26a and 26b occurs where there is relative rotation in the opposite directional sense. In other embodiments, radially outer race structures 26a and 26b may be rotatable relative to housing 10 as well as inner race 23, and follower members 15.

In operation of shaft 11, as an input shaft in one embodiment, transmits rotation of the shaft 11 to the inner race 23, the rotation of which causes rotation of the spherical planetary members 25 by rolling contact. The spherical planetary members 25 are in rolling contact with outer race 26. In one embodiment, outer race 26 may be non-rotating relative to rotation of the CVT housing 10. In the shown embodiment, housing 10 rotates as an output. In other embodiments, outer race 26 may rotate and connect to an output shaft. Rotation of the spherical planetary members 25 is transmitted via the planet followers 15 to the planet carrier 14 and thus to an output shaft 31 in one embodiment. In other embodiments, the planet carrier 14 is held at zero rotation and the rotation is transmitted to outer race 26. Spherical planetary members 25 are also in rolling contact with outer race 26. By hydraulic displacement in hydraulic chamber 29 via either increased or decreased hydraulic fluid, the two radially inner race structures 23a, 23b of the inner race can be urged towards one another or allowed to move axially away from one another respectively.

Axial approach of the two radially inner race structures 23a, 23b applies pressure to the spherical planetary members 25 causing the spherical planetary members 25 to move radially outwardly and urge the two radially outer race structures 26a, 26b apart to increase transmission ratio. In an embodiment, a ball ramp 64a and 64b between the radially outer race structures 26a, 26b and the spring 17 and housing 10 act in effect as a torque-sensitive mechanism in that the ball ramp 64a, 64b limits rotation of the two radially outer race structures 26a, 26b in either direction relative to the housing 10 in the current embodiment. Rotation of the outer race 26 in either direction causes the race structures 26a, 26b to approach one another axially when resisted by drag so that any play in the rolling contact between the races and the spherical planetary members 25 is taken up and compensated by the tendency of the race structures 26a, 26b to approach one another until the forces exerted on the ball ramps 64a, 64b between the race structures 26a, 26b and the housing 10 matches the reaction forces between the race structures 26a, 26b and the spherical planetary members 25. At this point no further relative axial displacement of the race structures 26a, 26b takes place and drive transmission takes place at a transmission ratio determined by the radial position of the spherical planetary members 25 relative to shaft 11. Alternatively or in addition, the radially outer race structures may utilize a torque-sensitive coupling in the form of a helical interengagement such as that described in embodiments above. Other torque-sensitive mechanism arrangements are also contemplated using a variety of inclined plane structures which may or may not include rotating or ball structures to reduce friction.

As can be seen in FIG. 5, radially inner race structures 23a and 23b form inner race 23 which may be in rolling contact with spherical planetary member 25. Hydraulic cavity 29 is formed between radially inner race structures 23a and 23b and inner race hydraulic cavity housings 20a and 20b. It is understood that a hydraulic cavity 29 need only be formed on one side of race 23 to function as an axial displacement control mechanism for race 23. In other embodiments, CVT housing 10 may serve as inner race hydraulic cavity housings 20a and 20b as described above. In yet other embodiments, hydraulic cavity 29 may be formed between radially inner race structures 23a and 23b and an inner race hydraulic cavity housing, which may include an outer race hydraulic cavity housing (not shown), separate from the CVT housing 10. Hydraulic port 34 permits adjustment to hydraulic pressure and fluid levels in the hydraulic cavity 29. Input or removal of hydraulic fluid may be made via connector port 38. Hydraulic port 34 is linked to connector port 38 via a hydraulic line 35 and in shaft 11. Since shaft 11 may be rotating, hydraulic line 35 may link to connector port 38 via a rotating hydraulic connection 36. In the embodiment of FIG. 5, hydraulic port 34 provides uniform application of hydraulic pressure in a common hydraulic cavity 29 associated with radially inner race structures 23a and 23b. Hydraulic displacement with increase of hydraulic fluid will axially urge radially inner race structures 23a and 23b together while reduction of hydraulic fluid will cause negative displacement and allow radially inner race structures 23a and 23b to separate axially. Thus, some uniformity and symmetry may be maintained between radially inner race structures 23a and 23b, especially when positive hydraulic pressure is applied.

Nonetheless, it is possible for radially inner race structures 23a and 23b to float or slide to one or the other side causing spherical planetary members 25 and outer race 26 to also potentially slide in some embodiments. This is addressed more fully similar to the embodiments described above for FIGS. 1-4. Input port 38 allows for hydraulic fluid connection to the CVT to allow control over hydraulic displacement for radially inner race structures 23a and 23b via one or more hydraulic cavities 29. Sealing mechanisms 30 are used to establish a hydraulic cavity between radially inner race structures 23a and 23b and inner race hydraulic cavity housing 20 in the current embodiment. An inner race hydraulic cavity housing or other hydraulic cavity structure may also be fitted with radially inner race structures 23a and 23b of varied shapes (not shown) to accommodate a hydraulic cavity in other embodiments. The sealing mechanisms 30 may be an o-ring, a sealing layer, or a fluid bearing seal formed of hydraulic fluid at a junction point or points that are in close proximity between radially inner race structures 23a and 23b and hydraulic structures 20a, 20b. In the present embodiment, only three sealing mechanisms 30 are shown, two between the hydraulic structures 20a, 20b and radially inner race structures 23a and 23b and one between radially inner race structures 23a and 23b. Such junction points may be, for example, edges or shoulders of radially inner race structures 23a and 23b and corresponding edges or shoulders of inner race hydraulic cavity housing 20a, 20b or the other radially inner race structure designed to fit together in close proximity. The sealing mechanisms 30 may permit radially inner race structures 23a and 23b to still move axially. In some embodiments, sealing mechanisms 30 may permit radially inner race structures 23a and 23b to rotate about the axis shaft 11.

Similar to that described above, it may be seen that when the radius of rolling contact between the spherical planetary members 25 and the inner race 23 is relatively small and the radius of contact between the spherical planetary members 25 and the outer race 26 is also relatively small, the transmission ratio between the shaft 11 and rotating housing 10 or an output shaft (not shown) is at a low level. By actuating hydraulic displacement in hydraulic cavity 29, radially inner race structures 23a and 23b are urged to move together so that the spherical planetary members 25 can move radially outwardly compensated by axial approach of the radially outer race structures 26a, 26b. This increases the transmission ratio between the shaft 11 and output drive source such as rotating housing 10 or an output shaft. It is appreciated that a reverse ratio relationship may be established by reversing an output drive source and an input drive source.

By relaxing hydraulic displacement in hydraulic cavity 29 via negative displacement, radially inner race structures 23a and 23b are allowed to move apart so that the spherical planetary members 25 can move radially outwardly again compensated by axial approach of the radially outer race structures 26a, 26b. This again reduces the transmission ratio.

In the CVT embodiments described herein, arrangement of input and output is not limited to as described above in FIGS. 1-5. It is understood that one or more input shafts may be linked to any one or more of the inner race 23, planet carrier 14, or outer race 26. Likewise, it is contemplated that one or more output shafts or other structures may be linked to any one or more of the inner race 23, planet carrier 14, or outer race 26 in various embodiments. Further, housing 10 may serve as an input or output of drive rotation and be coupled non-rotatably to any one or more of the inner race 23, planet carrier 14, or outer race 26. Any combination of input drive rotation via shaft, gear connection/hub, rotational housing, belt drive, or other is contemplated.

Figure 6:
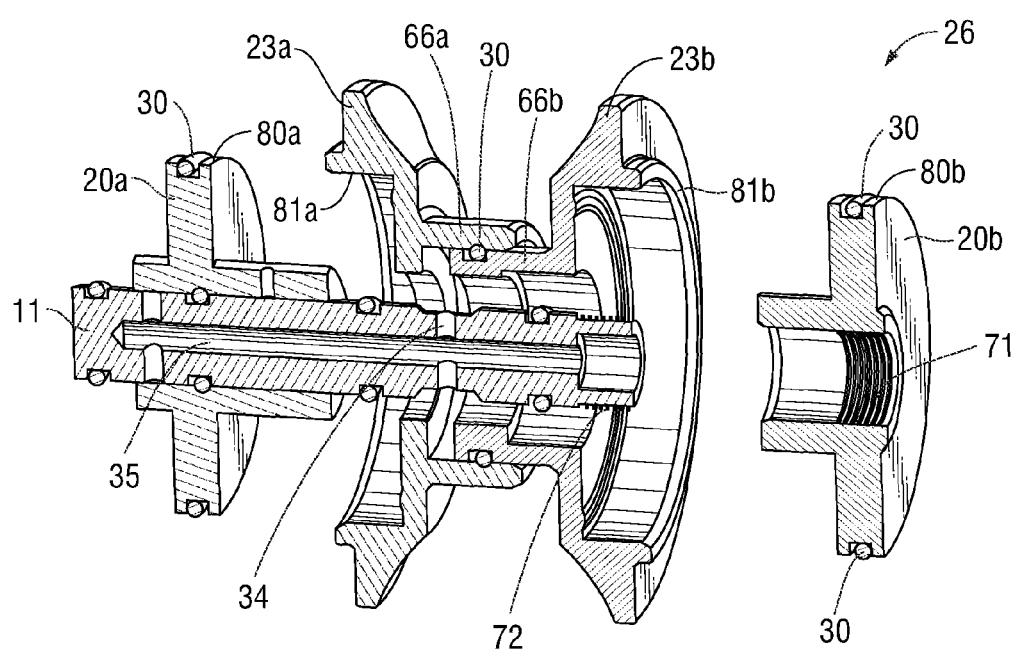
FIG. 6 is an axial sectional schematic view of an inner race assembly according to an embodiment of the present disclosure.

FIG. 6 shows an axial cross-section view of an inner race assembly 60 of a continuously variable transmission (CVT) according to an embodiment of the present disclosure. Inner race assembly 26 includes shaft 11, radially inner race structures 23a and 23b, inner race hydraulic cavity housings 20a and 20b, and a plurality of sealing mechanisms 30. Hydraulic port 34 is connected to hydraulic line 35 within shaft 11. Since FIG. 6 is also an exploded view for ease of viewing, hydraulic cavities are not shown intact but would be formed between radially inner race structures 23a and 23b and inner race hydraulic cavity housings 20a and 20b which slide inwardly on shaft 11 and fit correspondingly into radially inner race structures 23a and 23b. Inner race hydraulic cavity housing 20b is shown with helical threads 71 for attachment on corresponding threads 72 on shaft 11.

Radially inner race structures 23a and 23b are shown and include arcuate rolling contact surfaces 27a and 27b. Sealing mechanisms 30 are shown in the present embodiment mounted on an edge 80a and 80b of a disc-like extension of inner race hydraulic cavity housings 20a and 20b that correspond to a shoulder or edge 81a and 81b of a surface opposite to arcuate rolling contact surfaces 27a and 27b of radially inner race structures 23a and 23b. Corresponding edges or shoulders of radially inner race structures 23a and 23b and inner race hydraulic cavity housings 20a and 20b may be of any geometry to establish surfaces in close proximity to form a seal with a sealing mechanism. Edge 80a and 80b is designed to nest into a corresponding edge or shoulder surface 81a and 81b of radially inner race structures 23a and 23b to establish a hydraulic seal on one side of a hydraulic cavity. In other embodiments, sealing mechanisms 30 could also be mounted on the shoulder or edge 81a or 81b of radially inner race structures 23a and 23b in close proximity to inner race hydraulic cavity housings 20a and 20b. In yet other embodiments, such as with a fluid bearing seal, sealing mechanisms may not be mounted on either edge or surface, but form a seal by virtue of the proximity of the surfaces and presence of hydraulic fluid. In this example, embodiment o-ring sealing mechanisms are shown, but several alternate sealing mechanisms are contemplated including example embodiments discussed further above.

An additional sealing mechanism 30 may be mounted on an extension surface 66b of radially inner race structure 23b that fits correspondingly into a cavity formed by extension surface 66a of radially inner race structure 23a. Extension surfaces 66a and 66b extend from surfaces between radially inner race structures 23a and 23b. Extension surfaces 66a and 66b still allow radially inner race structures 23a and 23b to move axially in alignment. Extension surfaces 66a and 66b need not rotatably limit radially inner race structures 23a and 23b with respect to one another in one embodiment. In other words, the extension surfaces 66a and 66b may be circular to allow rotation of radially inner race structures 23a and 23b. In other embodiments, extension surfaces 66a and 66b may rotatably limit radially inner race structures 23a and 23b with respect to one another similar to that described with reference to FIGS. 4A and 4B. Extension surface 66b may be such that a polygonal cavity is established inside an edge of extension surface 66b. Extension surface 66a may be a polygonal extension surface that fits correspondingly into polygonal cavity of extension surface 66b. In other embodiments, extension surfaces 66a and 66b may be of other shapes so as to fit correspondingly and maintain rotational symmetry between radially inner race structures 23a and 23b or race load ramp inner parts as described above. For example, other embodiments may use a spline, dowel pegs, or other structures to rotationally constrain radially inner race structures 23a and 23b while allowing axial movement as is understood. In the current embodiment, extension surfaces 66a and 66b establish surfaces in close proximity and a sealing mechanism may be mounted or formed between them to form a second hydraulic seal on another side of the hydraulic cavity. Hydraulic seam mechanisms similar to the sealing mechanisms described above may be used. As shown in FIG. 6, for example, a sealing mechanism 30 that may be an o-ring is mounted to extension surface 66b of radially inner race structure 23b. In other embodiments, sealing mechanism 30 may be mounted to extension surface 66a. In yet another embodiment, one or more additional edges or shoulders may be formed elsewhere on radially inner race structures 23a and 23b with a corresponding edge or shoulder structure on inner race hydraulic cavity housings 20a and 20b to form a second hydraulic seal by virtue of surfaces of radially inner race structures 23a and 23b and inner race hydraulic cavity housings 20a and 20b being in close proximity and having a sealing mechanism. The one or more additional hydraulic sealing mechanisms of these embodiments establish another side of the hydraulic cavity.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups, but do not preclude the presence or addition of one or more other features, integers, steps, operations, elements, components, or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element is referred to as being "on," "engaged to," "connected to," or "coupled to" another element or layer, it may be directly on, engaged, connected or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "or" includes any and all combinations of one or more of the associated listed items. For example, a list of items A or B is satisfied by any one of the following: just A is present or occurs, just B is present or occurs, and both A and B are present or occur. Similarly, in descriptions of embodiments in the specification the term "and" is similarly broad and the various embodiments contemplated may include any and all combinations of one or more of the associated listed items.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A continuously variable transmission (CVT) comprising:
   a radially inner race, having a first radially inner race structure and a second radially inner race structure spaced along an axis wherein at least one of the first radially inner race structure or the second radially inner race structure is axially movable;
   a radially outer race, having a first radially outer race structure and a second radially outer race structure spaced along an axis wherein at least one of the first radially outer race structure or the second radially outer race structure is axially movable;
   planetary members in rolling contact with the radially inner races and the radially outer races;
   an outer race assembly including:
      a hydraulic cavity housing;
      the first radially outer race structure nestingly engaged with the hydraulic cavity housing;
      a hydraulic cavity sealed between the hydraulic cavity housing and the first radially outer race structure to control axial movement of the first radially outer race structure,
      wherein the sealed hydraulic cavity permits axial movement of the first radially outer race structure with respect to the hydraulic cavity housing and to maintain the hydraulic cavity; and
   the first radially inner race structure rotationally constrained with respect to the rotation of the second radially inner race structure via an extension engagement with the first radially inner race structure and the second radially inner race structure, wherein the first and second radially inner race structures have limited rotational displacement with respect to each other.

2. The continuously variable transmission of claim 1, wherein the first radially inner race structure is rotationally constrained via a polygonal extension from a surface of the first radially inner race structure that fits correspondingly within a polygonal cavity formed on the second radially inner race structure.

3. The continuously variable transmission of claim 1, wherein the first radially inner race structure and the second radially inner race structure are rotationally constrained to each other by operative coupling via a spline structure.

4. The continuously variable transmission of claim 1, wherein the first radially inner race structure further comprises a race load ramp part operatively coupled to an inclined plane structure that is one of an inclined plane, a ball ramp, a roller ramp, or a ball screw.

5. The continuously variable transmission of claim 1, wherein the first radially inner race structure and the second radially inner race structure are rotationally constrained with respect to each other to limit axial sliding of the planetary members.

6. The continuously variable transmission of claim 1, further comprising:
   a first race load ramp inner part of a first inclined plane structure operatively coupled to the first radially inner race structure; and
   a second race load ramp inner part of a second inclined plane structure operatively coupled to the second radially inner race structure,
   wherein the first race load ramp inner part and the second race load ramp inner part are rotationally constrained with respect to each other to limit axial sliding of the planetary members.

7. The continuously variable transmission of claim 1, further comprising:
   an input or output shaft operatively coupled to the radially inner race such that the radially inner race is rotationally constrained with respect to rotation of the input or output shaft.

8. The continuously variable transmission of claim 1, further comprising:
   a second outer race assembly including:
      a second hydraulic cavity housing nestingly engaged with the second radially outer race structure; and
      a second hydraulic cavity sealed between the second hydraulic cavity housing and the second radially outer race structure to control axial movement of the second radially outer race structure.

9. The continuously variable transmission of claim 8, further comprising:
   a hydraulic port operatively coupled to the first hydraulic cavity and to the second hydraulic cavity for controlling symmetry of hydraulic displacement via both the first hydraulic cavity and the second hydraulic cavity.

10. A radially inner race or a radially outer race for a continuously variable transmission (CVT) comprising:
   a first race structure and a second race structure spaced along an axis;
   the first race structure and the second race structure each having an arcuate surface for rolling contact with planetary members of an epicyclic CVT; and
   the first race structure rotationally constrained with respect to the rotation of the second race structure via an extension engagement with the first race structure and the second race structure, wherein the first and second race structures have limited rotational displacement with respect to each other.

11. The radially inner race or radially outer race of claim 10, wherein the first race structure and the second race structure are operatively coupled to an inclined plane structure that is one of an inclined plane, a ball ramp, a roller ramp, or a ball screw.

12. The radially inner race or radially outer race of claim 10, wherein the first race structure rotationally constrained with respect to the rotation of the second race structure further limits axial sliding of the radially inner race or radially outer race.

13. The radially inner race or radially outer race of claim 10, further comprising:
a polygonal extension from a first surface of the first race structure to fit correspondingly into a polygonal cavity of the second race structure to rotationally constrain the first race structure with respect to the rotation of the second race structure.

14. The radially inner race or radially outer race of claim 10, further comprising:
a first race load ramp inner part of a first inclined plane structure operatively coupled to the first race structure; and
a second race load ramp inner part of a second inclined plane structure operatively coupled to the second race structure,
wherein the first race load ramp inner part and the second race load ramp inner part are rotationally constrained with respect to each other to limit axial sliding of the radially inner race or radially outer race.

15. The radially inner race or radially outer race of claim 10, wherein the first race structure and the second race structure are rotationally constrained by operative coupling via a spline structure.

16. A continuously variable transmission (CVT) comprising:
a radially inner race, having a first radially inner race structure and a second radially inner race structure spaced along an axis wherein at least one of the first radially inner race structure or the second radially inner race structure is axially movable;
a radially outer race, having a first radially outer race structure and a second radially outer race structure spaced along an axis wherein at least one of the first radially outer race structure or the second radially outer race structure is axially movable; and
planetary members in rolling contact with the radially inner races and the radially outer races;
an inner race assembly including:
a hydraulic cavity housing;
the first radially inner race structure nestingly engaged with the hydraulic cavity housing;
a hydraulic cavity sealed between the hydraulic cavity housing and the first radially inner race structure to control axial movement of the first radially inner race structure,
wherein the sealed hydraulic cavity permits axial movement of the first radially inner race structure with respect to the hydraulic cavity housing and to maintain the hydraulic cavity; and
the first radially outer race structure rotationally constrained with respect to the rotation of the second radially outer race structure, wherein the first and second radially outer race structures have limited rotational displacement with respect to each other.

17. The continuously variable transmission of claim 16, wherein the first radially outer race structure and the second radially outer race structure are rotationally constrained to each other by operative coupling via a spline structure.

18. The continuously variable transmission of claim 16, wherein the first radially outer race structure further comprises a race load ramp part operatively coupled to an inclined plane structure that is one of an inclined plane, a ball ramp, a roller ramp, or a ball screw.

19. The continuously variable transmission of claim 16, wherein the first radially outer race structure and the second radially outer race structure are rotationally constrained with respect to each other to limit axial sliding of the planetary members.

20. The continuously variable transmission of claim 16, further comprising:
a first race load ramp inner part of a first inclined plane structure operatively coupled to the first radially outer race structure; and
a second race load ramp inner part of a second inclined plane structure operatively coupled to the second radially outer race structure,
wherein the first race load ramp inner part and the second race load ramp inner part are rotationally constrained with respect to each other to limit axial sliding of the planetary members.

21. The continuously variable transmission of claim 16, further comprising:
a second inner race assembly including:
a second hydraulic cavity sealed between a second hydraulic cavity housing and the second radially inner race structure to control axial movement of the second radially inner race structure.

22. The continuously variable transmission of claim 16, further comprising:
a hydraulic port operatively coupled to the first hydraulic cavity for controlling symmetry of hydraulic displacement via the first hydraulic cavity of the first radially inner race structure and a hydraulic cavity of the second radially inner race structure.

* * * * *